US007518091B2

(12) United States Patent
Tandon et al.

(10) Patent No.: US 7,518,091 B2
(45) Date of Patent: Apr. 14, 2009

(54) RADIO FREQUENCY AND MICROWAVE RADIATION USED IN CONJUNCTION WITH CONVECTIVE THERMAL HEATING TO EXPEDITE CURING OF AN IMPRINTED MATERIAL

(75) Inventors: Shalabh Tandon, Chandler, AZ (US); Mitesh C. Patel, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 366 days.

(21) Appl. No.: 11/449,262

(22) Filed: Jun. 7, 2006

(65) Prior Publication Data

US 2006/0219715 A1 Oct. 5, 2006

Related U.S. Application Data

(62) Division of application No. 10/880,484, filed on Jun. 30, 2004, now Pat. No. 7,119,314.

(51) Int. Cl.
*H05B 6/46* (2006.01)
*H05B 6/80* (2006.01)
*B29C 59/02* (2006.01)

(52) U.S. Cl. ....................... 219/601; 219/680; 219/759; 219/770; 399/328; 347/102; 101/487

(58) Field of Classification Search ......... 219/770–778, 219/679–685, 601, 759, 634, 400; 399/328–338; 347/102, 171; 101/487–489
See application file for complete search history.

(56) References Cited

U.S. PATENT DOCUMENTS 4,435,072 A * 3/1984 Adachi et al. ............... 399/336
4,890,573 A 1/1990 Zaber
5,050,533 A 9/1991 Zaber
5,443,560 A 8/1995 Deevi et al.
6,350,973 B2 2/2002 Wroe et al.
6,662,719 B1 * 12/2003 Adachi .................. 101/128.21
2002/0171065 A1 11/2002 Lochun et al.
2005/0212888 A1 * 9/2005 Lehmann et al. ............ 347/171

FOREIGN PATENT DOCUMENTS

JP 2003-341204 12/2003

* cited by examiner

*Primary Examiner*—Philip H Leung
(74) *Attorney, Agent, or Firm*—Blakely, Sokoloff, Taylor & Zafman LLP

(57) ABSTRACT

A system and method is provided in which a radio frequency transmitter and/or a microwave frequency transmitter applies radio and/or microwave frequency energy, respectively, to an imprinted material to cure the imprinted material. In some embodiments, an oven may be used to apply thermal energy to the imprinted material in conjunction with the radio and/or microwave frequency energy to cure the imprinted material. In other embodiments, an oven is not used. The imprinted material may also include a susceptor that absorbs radio and/or microwave frequency energy and responsive thereto emits thermal energy to aid in curing the imprinted material. Further, at least one susceptor may be located externally and adjacent to the imprinted material. The external susceptor may absorb radio and/or microwave frequency energy, respectively, and responsive thereto emits thermal energy towards the imprinted material to aid in curing the imprinted material.

6 Claims, 4 Drawing Sheets

400

402

| Sample Name | Temp |
|---|---|
| A1 | 5min @ 90C, 10min @ 170C |
| A2 | 6min @ 170C |

| Degrees | A1 | A2 |
|---|---|---|
| CS1 Average<br>Stdev | | |

430

| Sample Name | Temp |
|---|---|
| B1 | 10min @ 90C, 18min @ 170C |
| B2 | Control (uncured) |

RADIO FREQUENCY AND MICROWAVE RADIATION USED IN CONJUNCTION WITH CONVECTIVE THERMAL HEATING TO EXPEDITE CURING OF AN IMPRINTED MATERIAL

This application is a Divisional of application Ser. No. 10/880,484, filed Jun. 30, 2004, now U.S. Pat. No. 7,119,314.

BACKGROUND

1. Field of the Invention

Embodiments of the invention relate to the field of curing imprinted materials, and more particularly, to the use of radio frequency and microwave radiation in conjunction with convective thermal heating to expedite the curing of an imprinted material.

2. Description of Related Art

Imprinting is the technique by which a preset pattern is embossed or imprinted into another material, thereby creating a negative pattern on the material. Existing techniques for imprinting features onto materials and the subsequent curing of these imprinted materials by utilizing high temperature convective heating ovens are subject to several drawbacks.

For example, the use of high temperature convective heating requires a significant amount of energy to produce the required high temperatures to cure the imprinted material. Further, the cure time for the imprinted material is very long. Due to the large amount of energy required and the lengthy cure times, the cost to cure imprinted materials is relatively high.

Moreover, the high temperatures required to cure imprinted materials often leads to feature "washout" due to the low viscosity of the imprinted material at high temperatures. The term washout refers to the dilution of features (e.g. angles, depth, etc.) that occurs when an imprinted material is held at particular temperature ranges for extended periods of time. This is common in oven-based high temperature global curing in which imprinted materials are cured by being subjected to high temperatures for relatively long periods of time.

Washout is particularly problematic for imprinted materials that require the imprinting of connectivity features for such applications as, for example, integrated circuits. These applications require stringent tolerances to ensure that required signal propagation standards are maintained in the finished integrated circuit.

BRIEF DESCRIPTION OF THE DRAWINGS

The invention may best be understood by referring to the following description and accompanying drawings that are used to illustrate embodiments of the invention.

In the drawings.

DESCRIPTION

In the following description, numerous specific details are set forth. However, it is understood that embodiments of the invention may be practiced without these specific details. In other instances, well-known circuits, structures, processes, and techniques have not been shown in order not to obscure the understanding of this description.

Generally, embodiments of the invention relate to a fast radio frequency (RF) and/or microwave frequency energy and hybrid-thermal curing process for thermo-set polymers to lock in imprinted or embossed features.

Particularly, embodiments of the invention relate to the application of convective heating and radio frequency (RF) and/or microwave heating to polymer materials, such as plastic polymers, semi-crystalline polymers, and other RF/microwave susceptible materials, in order to implement feature retention in the material. It should be appreciated that the hereinafter described embodiments may extend to any process for imprinting/embossing materials where the use of RF and/or microwave energy is utilized for the purpose of curing, heating, and causing an intermittent change of phase of matter.

In one embodiment, a system and method is provided in which a radio frequency transmitter and/or a microwave frequency transmitter may apply radio and/or microwave frequency energy, respectively, to an imprinted material and an oven may apply thermal energy to the imprinted material in conjunction with the radio and/or microwave frequency energy to cure the imprinted material. The imprinted material may also include a susceptor that absorbs radio and/or microwave frequency energy and responsive thereto emits thermal energy to aid in curing the imprinted material.

Embodiments of the invention also relate to a system and a method in which a radio frequency transmitter and/or a microwave frequency energy transmitter may apply radio and/or microwave frequency energy, respectively, to an imprinted material. Further, at least one susceptor may be located externally and adjacent to the imprinted material. The susceptor may absorb radio and/or microwave frequency energy, respectively, and responsive thereto emits thermal energy towards the imprinted material to aid in curing the imprinted material.

Embodiments of the invention may be described as a process that may be depicted as a process diagram, flow chart, flow diagram, structure diagram, or block diagram. Although a process diagram or flow diagram may describe the operation as a sequential process, many of the operations can be performed in parallel or concurrently. In addition, the order of the operations may be re-arranged. A process may correspond to a method, a procedure, a method of manufacturing or fabrication, etc.

Figure 1A:
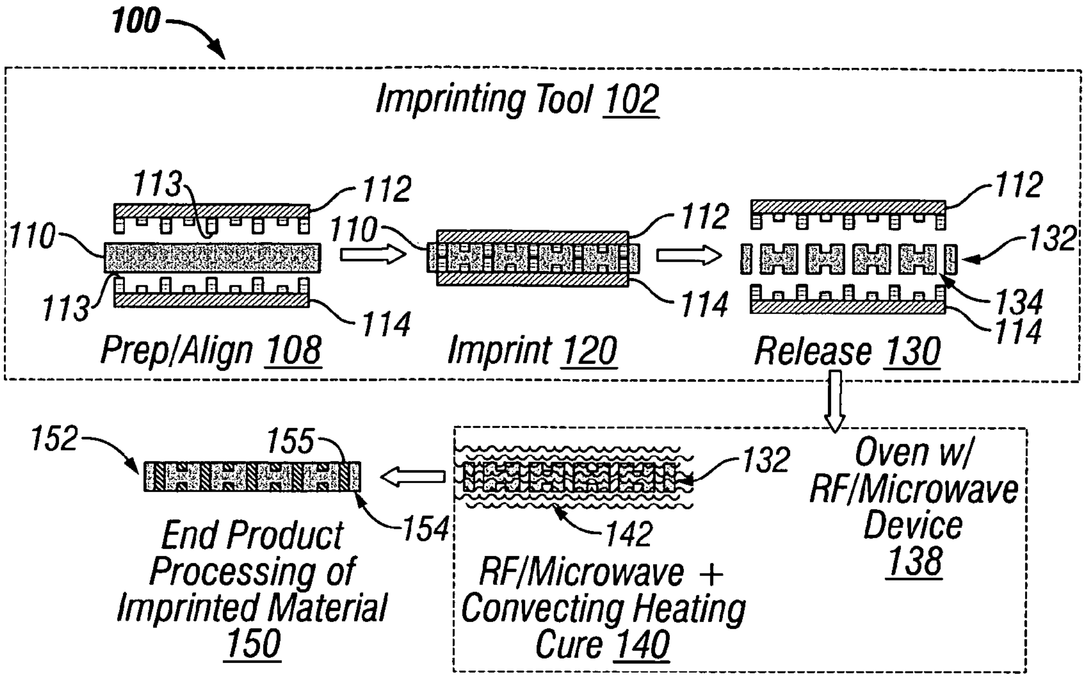
FIG. 1A shows a diagram illustrating a system and an associated process to cure a material having imprinted features utilizing radio frequency (RF) energy and microwave frequency energy in conjunction with convective heating, according to one embodiment of the invention.

Turning now to FIG. 1A, FIG. 1A shows a diagram illustrating a system 100 and an associated process to cure a material having imprinted features utilizing radio frequency (RF) energy and microwave frequency energy in conjunction with convective heating, according to one embodiment of the invention.

As shown in FIG. 1A, an imprinting tool 102 may be utilized to first imprint features into a material 110 to create an imprinted material. To begin with, a preparation and alignment phase 108 is performed in which the material 110 is located within the imprinting tool 102 between an opposed pair of imprinting plates 112 and 114 each having a predefined set of features 113 to be imprinted in the material 110. At the imprint phase 120, the imprinting plates 112 and 114 are compressed together into the material 110. For example, the imprinting plates 112 and 114 may be compressed utilizing an air-actuator or hydraulic process.

Then, at the release phase 130 the imprinting plates 112 and 114 are released back to their original positions resulting in an imprinted material 132 having a plurality of features 134 that are essentially the reverse features imprinted by the imprinting plates 112 and 114 of the imprinting tool 102. It should be appreciated that imprinting tools and the imprinting process flow are generally known to those of skill in the art.

The imprinted material 132 may have a variety of uses. For example, the imprinted material 132 may be an imprinted material for use in an integrated circuit (IC). In this case, the imprinted material 132 may include a supporting organic material layer, a metal layer, and a polymer layer such as a plastic polymer layer or a semi-crystalline polymer layer. Examples of IC's include a memory chip, a processor, a chip set, a logic device, a micro-controller, a microprocessor, etc. These types of devices often require interconnections between formed components requiring channels formed within the imprinted material to receive conductive materials such as copper, copper alloys, or any other suitable conducting materials, that provide electrical connections.

Also, the imprinted material 132 may also be a polymer having imprinted features for such items as compact disks (CDs), digital video disks (DVDs), hybrid magnetic-optical disks, etc. Further, it should be appreciated that any sort of suitable polymer-type material, for any purpose, may be utilized with embodiments of the invention to be described hereinafter related to hybrid RF/microwave and thermal curing.

Next, a radio frequency (RF) and/or microwave and convective heating curing phase 140 is performed on the imprinted material 132. For example, this may be accomplished with an oven having a RF/microwave device 138. Particularly, RF and/or microwave energy coupled with convective hybrid thermal heating is used to advance the curing state of the imprinted material 132.

Figure 1B:
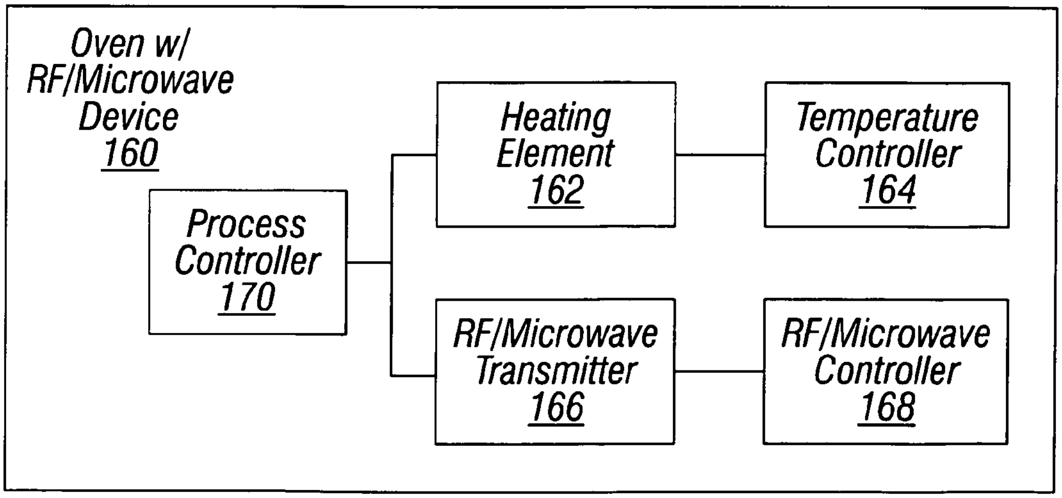
FIG. 1B shows a block diagram illustrating an example of an oven with a RF/microwave device, according to embodiment of the invention

Referring briefly to FIG. 1B, FIG. 1B shows a block diagram illustrating an example of an oven with a RF/microwave device 160, according to embodiment of the invention. The oven 160 may include a beating element 162 coupled to a temperature controller 164, as well as, both a RF and microwave transmitter 166 in turn controlled by a RF/microwave controller 168. All of these components may be further controlled by a global process controller 170.

With this configuration, any combination of desired temperatures and levels of RF and microwave energy can be programmed and controlled to impart the desired amount of convective heat and RF and microwave energy to an imprinted material. However, it should be appreciated that this is just one example of an oven with an RF/microwave device and many other suitable configurations may be utilized.

Referring back to FIG. 1A, at the RF/microwave and convective heating curing phase 140, RF and/or microwave energy 142 is applied to the imprinted material 132 by the radio frequency transmitter and the microwave frequency transmitter to cure the imprinted material. It should be appreciated that either radio frequency or microwave frequency energy, or both, may be utilized depending upon the desired curing parameters. Further, the oven also applies thermal energy (e.g. via a heating element) to the imprinted material in conjunction with the RF and/or microwave frequency energy 142 to cure the imprinted material.

The imprinted material 132 is generally a material that is susceptible to curing by applied RF and/or microwave frequency energy. For example, the imprinted material may be either one of a plastic polymer material or a semi-crystalline polymer material.

In one embodiment, susceptor type materials (not shown), such as molecules or other ingredients, may be physically included in the imprinted material to absorb RF and/or microwave frequency energy and responsive to the absorbed energy emit thermal energy to aid in curing the imprinted material.

For example, carbon-black is a material that interacts strongly with RF and/or microwave radiation. Thus, the use of carbon-black may be incorporated into the imprinted material 132 to speed up the curing process. However, it should be appreciated that any sort of susceptor that absorbs RF and/or microwave frequency energy and that emits thermal energy in response thereto may be utilized to aid in curing the imprinted material 132.

Lastly, end product processing of the imprinted material 150 may be performed. At this point, the cured imprinted material 152 having features 154, may have the imprinted features 154 filled with a material 155 as part of the end product. For example, in the case of an IC, copper may be inserted into the imprinted features 154 to provide electrical connections as previously discussed.

Figure 2A:
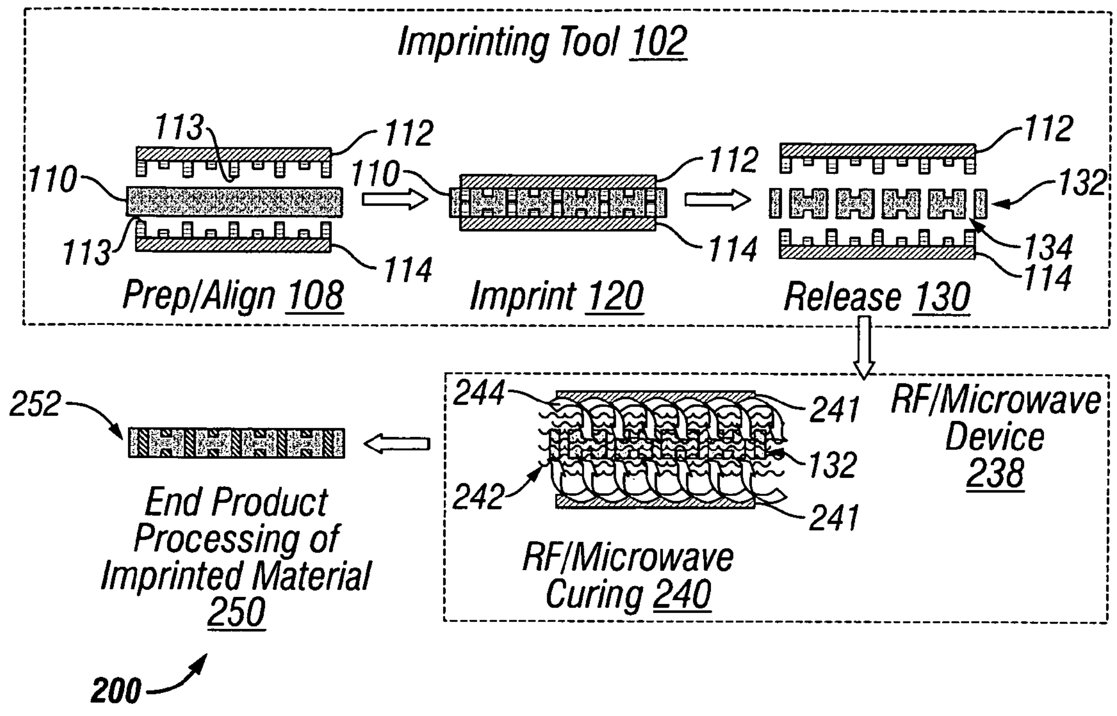
FIG. 2A shows a diagram illustrating a system and an associated process for RF and/or microwave frequency energy and hybrid-thermal curing of an imprinted material, according to another embodiment of the invention.

Turning now to FIG. 2A, FIG. 2A shows a diagram illustrating a system 200 and an associated process for RF and/or microwave frequency energy and hybrid-thermal curing of an imprinted material, according to another embodiment of the invention. As shown in FIG. 2A, an imprinting process is first performed with an imprinting tool 102. This process includes preparation and alignment 108 of the material 110, imprinting 120 of the material 110, etc., as previously described in detail with reference to FIG. 1A. Since this process has already been described in detail, for brevity's sake, it will not be repeated.

After the features 134 in the material 110 have been formed, the imprinted material 132 having features 134 undergoes a RF and/or microwave curing phase 240 as will be hereinafter discussed. Particularly, an RF/microwave device 238 may be utilized that includes susceptors 241.

Figure 2B:
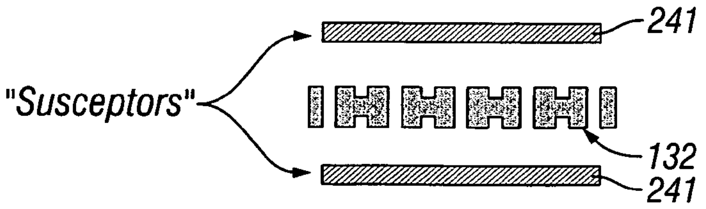
FIG. 2B illustrates an imprinted material located between two parallely opposed susceptors, according to one embodiment of the invention.

With brief reference also to FIG. 2B, FIG. 2B illustrates the imprinted material 132 located between two parallely opposed susceptors 241, according to one embodiment of the invention.

Figure 2C:
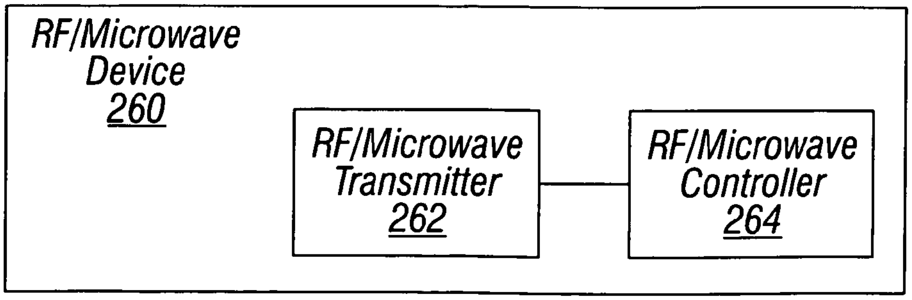
FIG. 2C shows a diagram illustrating an example of an RF/microwave device, according to one embodiment of the invention.

Also, with reference to FIG. 2C, FIG. 2C shows a diagram illustrating an example of an RF/microwave device 260, according to one embodiment of the invention. It should be noted that in this embodiment an oven with a heating element is not utilized. Particularly, the RF/microwave device may include an RF and/or microwave transmitter 262 and a RF and/or microwave controller 264 to apply and control, respectively, the amount of RF and/or microwave radiation imparted to the imprinted material 132 dependent upon the desired amount of curing.

Returning to FIG. 2A, radio frequency energy and/or microwave frequency energy 242 is applied to the imprinted material 132. For example, this may be accomplished by the RF/microwave transmitter 262. Further, a pair of parallely opposed susceptors 241 may be located externally and adjacent to the imprinted material 132. The susceptors 241 absorb radio frequency energy and/or microwave frequency energy and responsive thereto emit convective thermal energy 244

(i.e. convective heat) towards the imprinted material 132 to aid in curing the imprinted material.

Particularly, in this process, the susceptors 241 absorb RF and/or microwave energy and impart thermal energy (convectively) onto the imprinted material 132. Thus, the curing is accomplished by both RF and/or microwave energy, as well as, curing by convective heat. However, this is accomplished without actually applying convective heat utilizing an oven. Instead, this is accomplished purely by utilizing RF and/or microwave energy.

As previously discussed, the imprinted material 132 is typically a material that is susceptible to curing by applied RF energy and microwave frequency energy. For example, the imprinted material may be either one of a plastic polymer material or a semi-crystalline polymer material. Further, as previously discussed, the cured imprinted material 252 may further undergo end product processing 250, as previously discussed with reference to FIG. 1A.

Figure 3:
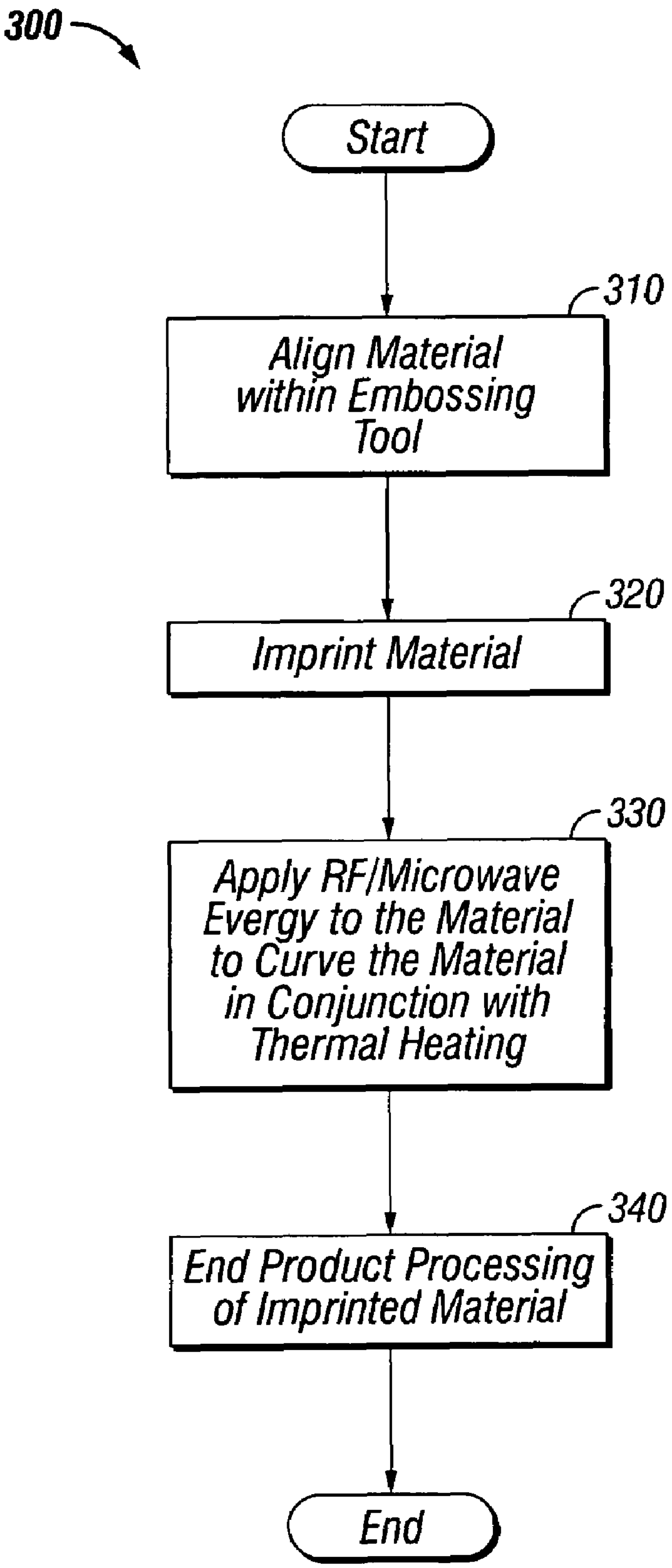
FIG. 3 is a flow diagram illustrating a process for curing an imprinted material, according to one embodiment of the invention.

Turning now to FIG. 3, FIG. 3 is a flow diagram illustrating a process 300 for curing an imprinted material, according to one embodiment of the invention.

Upon START, the process 300 aligns a material within an embossing tool (block 310). The material is then imprinted with a plurality of pre-defined features (block 320).

Next, the process 300 applies RF and/or microwave energy to the imprinted material to cure the imprinted material in conjunction with thermal heating (block 330). The imprinted material then may undergo end product processing (block 340). The process 300 is then terminated.

By applying RF and/or microwave energy to the imprinted material to cure the imprinted material, a significant reduction in curing time may be achieved. Further, embodiments of the invention provide for lower energy costs because the use of RF and/or microwave energy in the curing process is more energy efficient than the use of purely thermal curing.

Furthermore, higher through-put rates for the curing of imprinted materials may be realized. This is because the reduced curing times allow for higher production rates and capacities, either in-line or in parallel, versus conventional thermal curing processing. Moreover, better imprinted profile retention is achieved because feature quality is directly related to the amount of time that the curing process takes. Because of the reduced time and energy utilized in the curing process, better feature quality is achieved, as compared to conventional convective heat curing.

Figure 4:
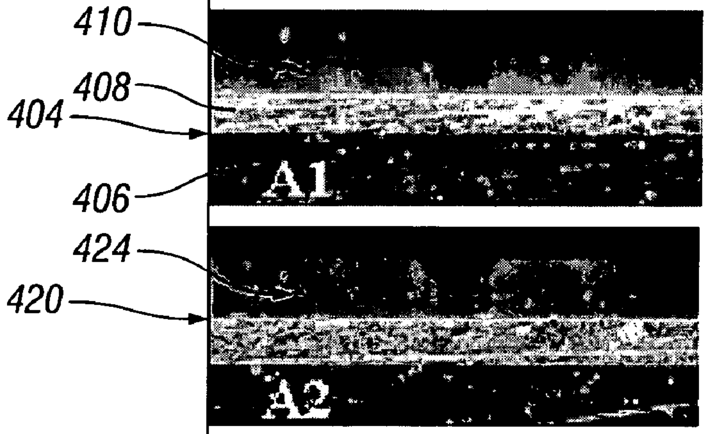
FIG. 4 is a diagram illustrating test results that were achieved utilizing embodiments of the invention, in which RF and microwave energy were applied to an imprinted material to cure the imprinted material.
Figure 4:
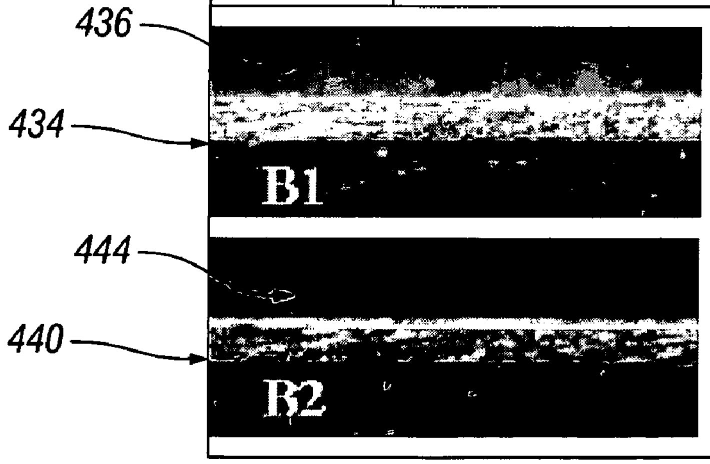

Turning now to FIG. 4, FIG. 4 is a diagram illustrating test results that were achieved utilizing embodiments of the invention, in which RF and microwave energy were applied to an imprinted material, to cure the imprinted material.

Looking first at sample imprinted materials A1 and A2, these test results will first be discussed. Table 402 shows the conditions that were applied to the sample imprinted materials A1 and A2. As to A1, sample A1 404 was first cured at a temperature of 90 Celcius (C.) for five minutes and then at a temperature of 170° C. for ten minutes utilizing RF and microwave energy. It should be noted that as seen in sample representation A1 404, the A1 sample, as with all the other samples to be discussed, has a supporting organic layer 406, a metal layer 408, and a cured polymer material layer 410.

Similarly, sample representation A2 420 is shown below A1 and also particularly illustrates a cured polymer material layer 424. As shown in table 402, sample A2 was held at 170° C. for six minutes utilizing applied RF and microwave energy.

Briefly referring to table 430 and sample representation B1 434, sample B1 was held at 90° C. for ten minutes and at 170° C. for eighteen minutes. Sample representation B1 434 illustrates the cured polymer material layer 436.

On the other hand, sample B2 as shown in sample representation 440, and as referenced in table 430, was held as a control sample essentially uncured. Sample representation B2 440, and particularly the polymer material layer 440, was only 50% cured during the imprinting and subsequent time period in which it was exposed only to room temperature.

However, it can be seen with reference to sample representations A1, A2, and B1 (404, 420, 434), that all of their respective cured polymer material layers 410, 424, and 436, that were all exposed to applied RF and microwave energy, all show sharp retained imprinted features as shown by their well-defined angles. These angles measure the "goodness" of the imprinted features and are well within acceptable tolerance ranges.

The control sample B2 440, and particularly the polymer material layer 444, shows a high degree of "washout". As previously discussed, washout refers to the dilution of features (e.g. angles, depth, etc.) when the sample is held at a certain temperature for a relatively long period of time.

In contrast, the features of the cured polymer material layers 410, 424, and 436 of respective samples A1, A2, and B1, each respectively show sharp and crisp imprinted features in terms of their angles and depth such that they have very good feature quality and little washout. This is a vast improvement over standard conventional convective heat-based curing.

While the invention has been described in terms of several embodiments, those of ordinary skill in the art will recognize that the invention is not limited to the embodiments described but can be practiced with modification and alteration within the spirit and scope of the appended claims. The description is thus to be regarded as illustrative instead of limiting.

What is claimed is:

1. A method comprising:

imprinting a material with a feature;

applying radio frequency energy to an imprinted material to cure the imprinted material;

applying microwave frequency energy to the imprinted material to cure the imprinted material, the imprinted material being susceptible to curing by applied radio frequency energy and microwave frequency energy; and wherein the imprinted material includes a susceptor that absorbs radio frequency energy and microwave frequency energy and responsive thereto emits thermal energy to aid in curing the imprinted material.

2. The method of claim 1 further comprising applying thermal energy to the imprinted material to cure the imprinted material.

3. The method of claim 1 wherein the imprinted material is either one of a plastic polymer material or a semi-crystalline polymer material.

4. The method of claim 1 wherein the susceptor is a carbon black.

5. The method of claim 1 further comprising locating at least one susceptor externally and adjacent to the imprinted material, the at least one susceptor to absorb radio frequency energy and microwave frequency energy and responsive thereto to emit thermal energy towards the imprinted material to aid in curing the imprinted material.

6. The method of claim 5 wherein the at least one susceptor further comprises a pair of parallely opposed susceptors.

* * * * *